United States Patent
Pettesch

[11] Patent Number: 5,244,006
[45] Date of Patent: Sep. 14, 1993

[54] DOUBLE POPPET VALVE WITH REMOVABLE SHEAR FITTING

[75] Inventor: Martin C. Pettesch, Roselle, N.J.

[73] Assignee: Universal Valve Company, Inc., Elizabeth, N.J.

[21] Appl. No.: 852,770

[22] Filed: Mar. 17, 1992

[51] Int. Cl.$^5$ .................................... F16K 17/40
[52] U.S. Cl. .................................... 137/71; 137/68.1
[58] Field of Search ............... 137/68.1, 71, 493.3, 137/493.9

[56] References Cited

U.S. PATENT DOCUMENTS

| | | | |
|---|---|---|---|
| 2,898,926 | 8/1959 | Tsiguloff | 137/68 |
| 2,910,080 | 10/1959 | Wright et al. | 137/39 |
| 2,965,116 | 12/1960 | Boone et al. | 137/39 |
| 3,035,595 | 5/1962 | Beason, Jr. | 137/71 |
| 3,209,773 | 10/1965 | Klaus | 137/68 |
| 3,312,159 | 4/1967 | Shepherd | 137/72 X |
| 3,378,021 | 4/1968 | Milo | 137/68 |
| 3,515,157 | 6/1970 | Milo | 137/68 |
| 3,542,045 | 11/1970 | Kruckeberg et al. | 137/39 |
| 3,606,900 | 9/1971 | Wunderlich | 137/68 |
| 3,794,057 | 2/1974 | Badger | 137/68 |
| 4,056,117 | 11/1977 | Deeks | 137/68.1 |
| 4,119,111 | 10/1978 | Allread | 137/68 |
| 4,131,142 | 12/1978 | Barr et al. | 141/302 |
| 4,351,351 | 9/1982 | Flory et al. | 137/68 |
| 4,449,545 | 5/1984 | Vernor et al. | 137/68 |
| 4,483,359 | 11/1984 | Robertson | 137/68 |
| 5,099,870 | 3/1992 | Moore et al. | 137/68.1 X |

Primary Examiner—Martin P. Schwadron
Assistant Examiner—Kevin L. Lee
Attorney, Agent, or Firm—Klein & Szekeres

[57] ABSTRACT

A shut off valve, of the type having a normally open main valve that closes in response to a shear force of greater than a predetermined magnitude, and a normally closed secondary valve that opens in response to a predetermined fluid pressure, wherein the main valve is contained in a first sub-housing and the secondary valve is contained in a separate second sub-housing, downstream from the first sub-housing. A hollow, tubular shear fitting, having an annular shear groove, has an upstream end removably coupled to the downstream end of the first sub-housing, and a downstream end removably coupled to the upstream end of the second sub-housing, where by the first sub-housing, the shear fitting, and the second sub-housing are axially aligned so that they define a continuous internal flow passage from the upstream end of the first sub-housing to the downstream end of the second sub-housing. When the shear fitting fractures at the shear groove in response to a shear force, the fragmented shear fitting can be removed from the sub-housings and replaced, without replacing the sub-housings.

17 Claims, 2 Drawing Sheets

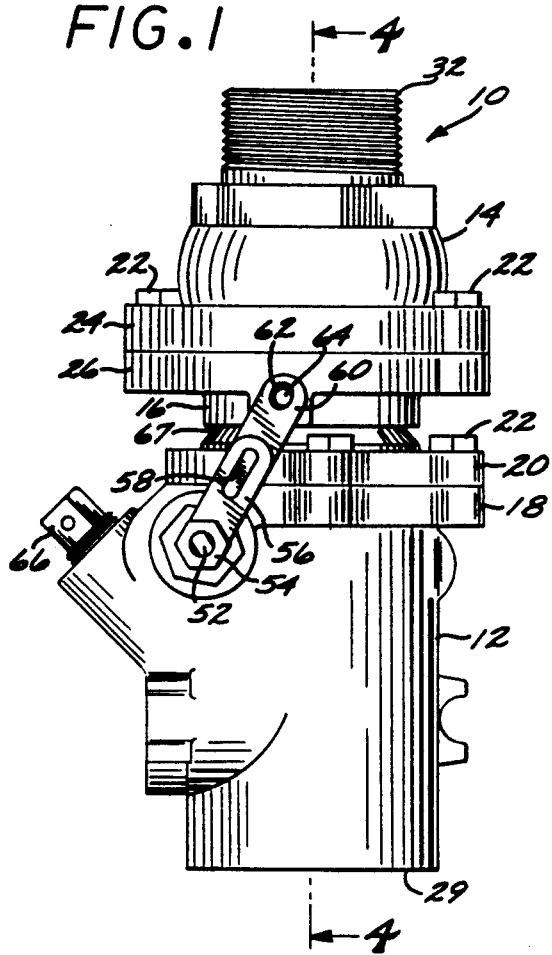
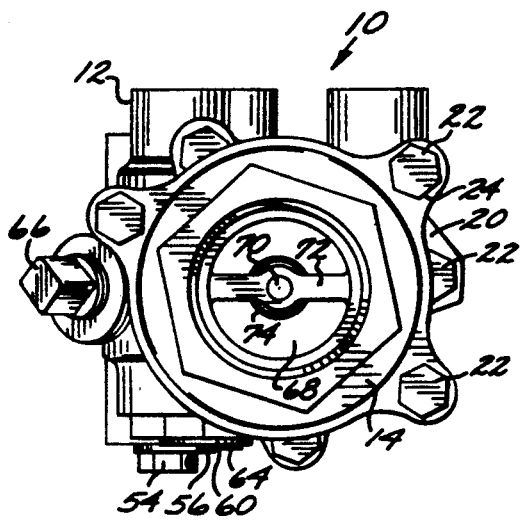
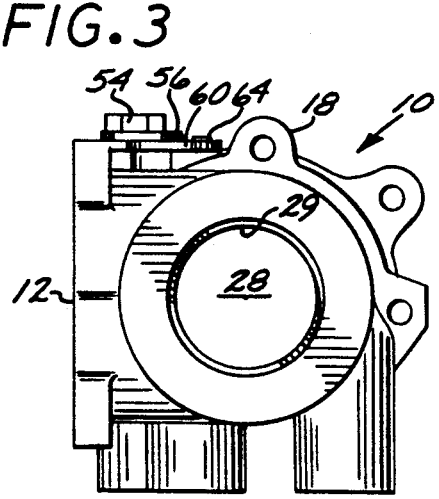
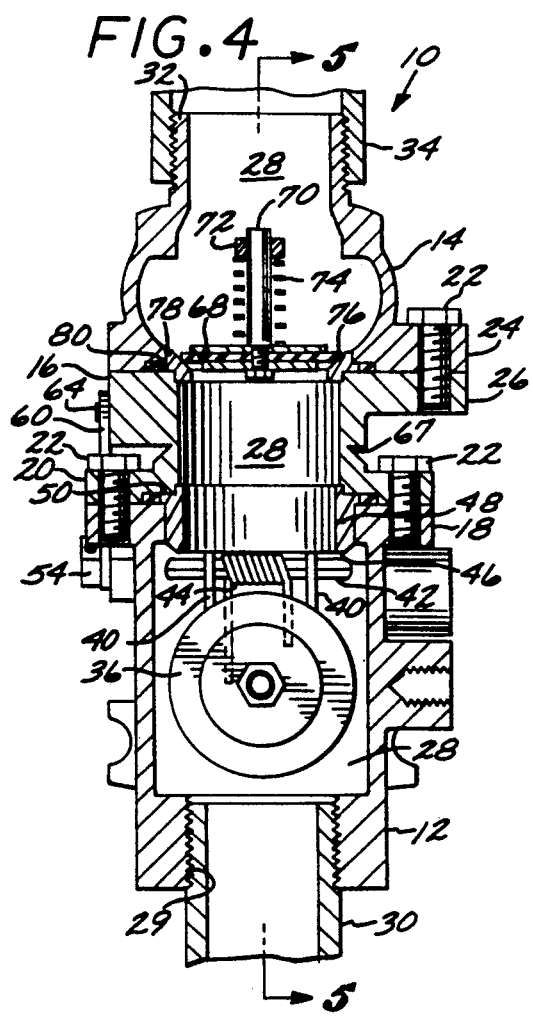

DOUBLE POPPET VALVE WITH REMOVABLE SHEAR FITTING

BACKGROUND OF THE INVENTION

This invention relates to the field of shut-off valves for fuel dispensing systems. More specifically, this invention relates to shut-off valves of the type having a main poppet and a downstream secondary poppet, with a shear groove therebetween.

Fuel storage and dispensing systems for service stations and the like typically include an underground fuel storage tank from which fuel is pumped to one or more above-ground fuel dispensers. It has become standard practice to place a shut-off valve in the fuel delivery pipe feeding each dispenser, the valve being advantageously located a short distance beneath the surface on which the dispenser sits. The primary purpose of the shut off valve is to stop the flow of fuel to the dispenser in response to a collision or physical shock sufficient to damage the delivery pipe and/or other components of the delivery system, thereby substantially preventing or minimizing fuel spillage. Many shut off valves also include a heat-sensitive fusible link in the valve mechanism, whereby the valve is closed in response to a fire.

Examples of prior art shut off valves are disclosed in the following U.S. Pat. Nos. 2,048,388—Johnsen; 2,898,926 Tsiguloff; 2,910,080—Wright et al.; 2,962,035—Wright et al.; 2,965,116—Boone et al.; 3,209,773—Klaus; 3,378,021— Milo; 3,489,160—Moore; 3,515,157—Milo; 3,647,182—Boudot et al.; 3,709,240—Milo; and 3,860,024—Turley.

One type of shut off valve that has come into increasing use is the so-called "double poppet" shut off valve. In the double poppet valve, a main poppet valve provides the primary shut off function in response to a physical shock and (if it includes a fusible link) to fire. A secondary poppet, located in the valve housing downstream from the main poppet seat, is held open by the pressure of fluid flowing through the valve housing from the inlet to the outlet. The secondary poppet thus functions as a check valve, closing when fluid ceases to flow upwardly from the tank to the dispenser. Typically, the valve housing has a weakened, frangible, annular wall section, or "shear groove" just upstream from the seat for the secondary poppet. The shear groove is designed to fracture in response to shear forces above a predetermined magnitude (such as from ground heave or from a collision between a vehicle and the dispenser), thereby providing shock isolation for the delivery system components located upstream from the shear groove. Any shock strong enough to fracture the shear groove will also close the main poppet. Fluid flow through the valve housing is thus blocked, causing the secondary poppet to close, and thereby containing any backflow from the dispenser to minimize spillage.

One drawback to the typical double poppet shut off valve is that the entire valve must be replaced, at substantial cost and inconvenience, whenever the shear groove fractures, since the shear groove is an integral part of the housing between the main and secondary poppets.

Accordingly, it would be desirable to have a shut off valve that has the advantages of the double poppet type of valve, but which does not require replacement of the entire valve structure in the event of a shear groove fracture.

SUMMARY OF THE INVENTION

Broadly, the present invention is an improved shut off valve assembly, of the type having a main poppet and a secondary poppet downstream therefrom, wherein the improvement is in the incorporation of the main poppet and the secondary poppet in separate sub-housings, removably connected to each other by a separate, removable fitting that includes an external shear groove and an internal flow passage leading from the main poppet sub-housing to the secondary poppet sub-housing.

More specifically, the present invention comprises a first or upstream sub-housing, having an inlet and an outlet, that contains a normally-open main poppet that closes in response to a physical shock or a fire; a second or downstream sub-housing, having an inlet and an outlet, that contains a normally-closed secondary poppet, spring-loaded to open only under the pressure of fluid flowing from the upstream sub-housing; and a shear fitting, removably connectable between the upstream and downstream sub-housings, and having an internal flow passage in fluid communication with the outlet of the upstream sub-housing and the inlet of the downstream sub-housing, the shear fitting having an annular shear groove in its external wall surface. The inlet of the upstream sub-housing and the outlet of the downstream sub-housing include coupling means for removably coupling the sub-housings to the fuel delivery conduit leading to the dispenser.

Because the separate sub-housings for the main and secondary poppets are connected by means of the removable shear fitting, a shear groove fracture necessitates the removal and replacement only of the shear fitting, and not the main or secondary poppet assemblies or sub-housings. Thus, substantial costs are saved in the event of a shear groove fracture.

An important design feature of the present invention is that the axial length of the shear fitting is kept to a minimum. This serves two purposes: (1) It allows the entire valve assembly to fit within the typical spill containment box that is installed underneath the pedestal on which the typical fuel dispenser is mounted; and (2) it minimizes the volume of fuel that is contained between the two poppets, and that can leak out in the event of a shear groove fracture.

These and other advantages of the present invention will be better appreciated from the detailed description that follows.

BRIEF DESCRIPTION OF THE DRAWINGS

FIG. 1 is an elevational view of a double poppet shut off valve in accordance with the present invention;

FIG. 2 is a top plan view of the valve of FIG. 1;

FIG. 3 is a bottom plan view of the valve of FIG. 1;

FIG. 4 is a cross-sectional view taken along line 4—4 of FIG. 1;

DETAILED DESCRIPTION OF THE INVENTION

Figure 5:
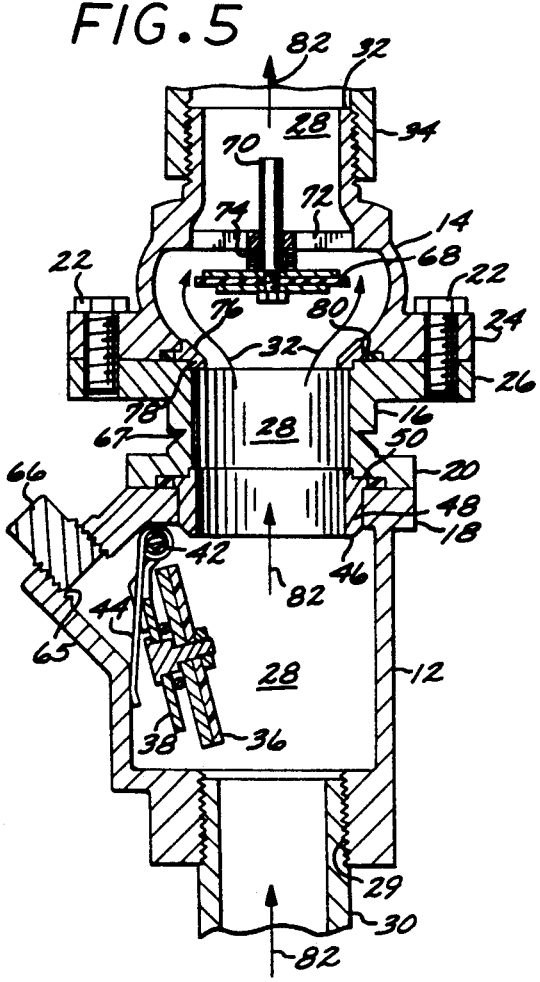
FIG. 5 is a cross-sectional view taken along line 5—5 of FIG. 4.

Referring to the drawings, a double poppet shut off valve 10, in accordance with a preferred embodiment of the present invention, will now be described in detail.

The valve 10 comprises three axially-aligned, hollow, substantially tubular housing elements: an upstream or main poppet sub-housing 12, a downstream or secondary poppet sub-housing 14, and a shear fitting 16 removably coupled between the two sub-housings. In the illustrated preferred embodiment, the downstream or outlet end of the main poppet sub-housing 12 has a flange 18 that seats against a shear fitting upstream flange 20, with a first plurality of bolts 22 removably connecting the flanges 18 and 20. Likewise, the upstream or inlet end of the secondary poppet sub-housing 14 has a flange 24 that seats against a shear fitting downstream flange 26, with a removable connection therebetween provided by a second plurality of bolts 22. Each of the housing elements 12, 14 and 16 defines a flow passage between its upstream and downstream ends. Thus, when the housing elements 12, 14, and 16 are coupled together, as best shown in FIG. 5, they define a continuous internal flow passage 28, which is substantially unobstructed and unrestricted through the shear fitting 16.

The valve 10 is designed to be coupled into a fuel delivery conduit system. As shown in FIGS. 4, 5, and 6, the main poppet sub-housing 12 has an upstream end or inlet 29 that is internally threaded for coupling to an externally-threaded downstream end of a first conduit 30 that extends from an underground fuel tank (not shown). The secondary poppet sub-housing 14 has a downstream end or outlet 32 that is externally threaded for coupling to an internally-threaded upstream end of a second conduit 34 that leads to an above-ground fuel dispenser (not shown). Typically, the entire valve 10 is contained in a spill containment box (not shown), located underground underneath the dispenser.

Figure 8:
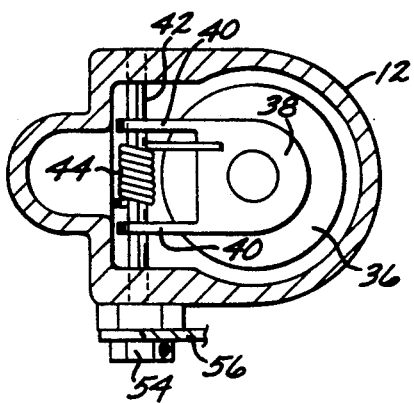
FIG. 8 is is a cross-sectional view taken along line 8—8 of FIG. 6.

The main poppet sub-housing 12 contains a main poppet assembly, which comprises a disk-shaped main poppet valve 36 that is fixed to the end of a carrier 38. The carrier 38 has a pair of bifurcated arms 40 that are fixed to a rotatable shaft 42. The shaft 42 is pivotally mounted in the main poppet sub-housing, and the arms 40, being fixed to the shaft 42, rotate with it. Wrapped around the central portion of the shaft 42, between the arms 40, is a coil spring 44, one end of which engages against the upstream side of the carrier 38 (as shown in FIG. 8), and the other end of which engages against the interior wall of the sub-housing 12. The spring 44, acting through the carrier, biases the main poppet valve 36 toward an annular main poppet seat 46 at the downstream end of the main poppet sub-housing 12.

Figure 6:
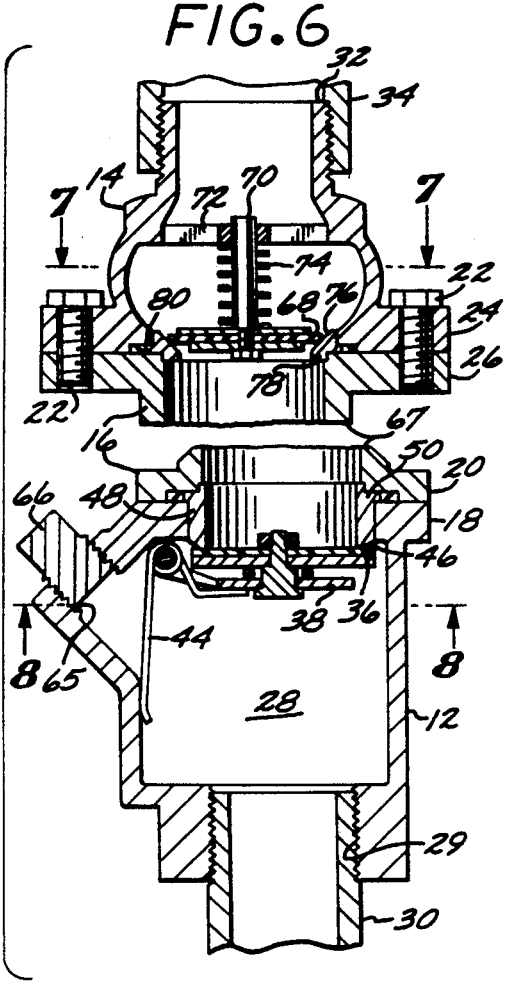
FIG. 6 is a cross-sectional view, similar to FIG. 5, but showing the valve after a fracture of the shear groove.
Figure 7:
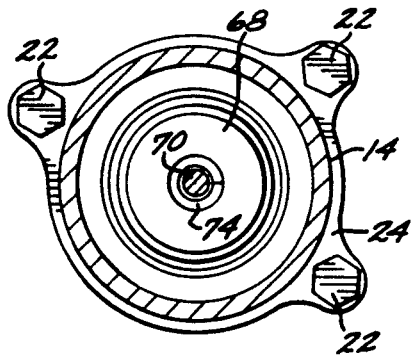
FIG. 7 is a cross-sectional view taken along line 7—7 of FIG. 6.

The main poppet seat 46, as shown in FIGS. 4, 5, and 6, may be formed at the upstream end of a short, tubular seat insert 48, that fits into the downstream opening of the main poppet sub-housing 12, and that has a peripheral rim 50 around its downstream end. The rim 50 is engaged between the main poppet sub-housing flange 18 and the shear fitting upstream flange 20, for fixing the seat insert 48 in place.

The shaft 42 has an end 52 that extends through the wall of the sub-housing 12, where it is connected, by a hex nut 54, to one end of a first locking arm member 56, the other end of which is rigidly joined, by a fusible link 58, to a second locking arm member 60. The second locking arm member 60 has a free end with an aperture 62 that receives a short projection or locking pin 64 that extends outwardly from the side of the shear fitting 16. The engagement between the pin 64 and the second locking arm member 60, the linkage between the locking arm members 56 and 60, and the connection between the first locking arm member 56 and the shaft 42, lock the shaft 42 in a position that maintains the main poppet valve 36 open against the force of the spring 44.

The fusible link 58 is designed to melt in response to temperatures associated with fuel combustion. Thus, in the event of a fire, the arm members 56 and 60 separate, thereby unlocking the main poppet valve 36, and allowing it to close against its seat 46 under the force of the spring 44 to stop the flow of fuel.

The main poppet sub-housing 12 is advantageously provided with a test port 65, sealed by a removable closure 66. The test port 65 allows the periodic pneumatic testing of the fuel delivery system (by conventional techniques, well-known in the art), without removing any of the components.

As previously mentioned, the upstream end of the shear fitting 16 is removably attached to the downstream end of the main poppet housing 12. The shear fitting has an annular shear groove 67 in its external wall surface that forms a weakened, frangible wall area around its periphery. The locking pin 64 is preferably located a short distance downstream from the shear groove 67.

As mentioned above, the upstream end of the secondary poppet sub-housing 14 is removably attached to the downstream end of the shear fitting 16. The secondary poppet housing 14 contains a normally closed secondary poppet assembly, comprising a disk-shaped secondary poppet valve 68, mounted at the upstream end of an axial shaft 70. The downstream end of the axial shaft 70 is journaled for axial movement through an aperture centrally located in a shaft journal 72, which, as shown in FIG. 2, comprises a rigid, horizontal member extending diametrically across the interior of the sub-housing 14. Carried between the shaft journal 72 and the downstream surface of the secondary poppet valve 68 is a coil spring 74 that biases the secondary poppet valve to close against secondary poppet seat 76. The secondary poppet seat 76 is advantageously defined by the downstream surface of an annular secondary poppet seat insert 78 that has a peripheral rim 80 captured between the secondary poppet sub-housing flange 24 and the shear fitting downstream flange 26.

The operation of the shut off valve 10 is illustrated in FIGS. 5 and 6. In normal operation, when the valve 10 is coupled into a fuel delivery system as described above, the main poppet valve 36 is held open by the locking arm elements 56 and 60, and their respective engagements with the shaft 42 and the locking pin 64, as previously described. The pressure of the fuel flowing through the flow passage 28 (as indicated by the arrows 82 in FIG. 5), forces the secondary poppet valve 68 open against the force of the spring 74.

As shown in FIG. 6, if a shear force (due to a collision or ground heave, for example) above a predetermined magnitude is received by the valve 10, the shear fitting 16 fractures at the shear groove 67, thereby isolating the main poppet sub-housing, and all components upstream from it, from the shear force. The movement of the shear fitting 16 relative to the main poppet sub-housing 12 causes the locking pin 64 to slip out of the locking arm aperture 62, so that the main poppet valve 36, no longer locked open, is released to close against the main poppet seat 46 under the force of the spring 44. The closing of the main poppet valve 36 prevents the flow of fuel out of the main poppet sub-housing 12 from the first conduit 30.

Furthermore, with the flow of fuel interrupted, the secondary poppet valve 68 closes against its associated seat 76 under the force of the spring 74, thereby preventing spillage from the backflow of fuel from the dispenser and the second conduit 34.

When the shear fitting 16 has been fractured, its upstream and downstream fragments are simply removed from the main poppet housing 12 and the secondary poppet housing 14, respectively, by removal of the bolts 22. Since the two sub-housings are substantially intact, a new shear fitting 16 can then be easily installed, without the need to replace either of the sub-housings. (Of course, the main poppet valve 36 will have to be reopened and locked in the open position with a new locking arm 56, 60.) This greatly reduces the cost of repairing the fuel delivery system, as compared to the costs associated with shut off valves in which the shear groove is incorporated into the valve housing itself.

Furthermore, the axial length (or height, when installed) of the shear fitting 16 is relatively small, as compared to the overall axial length of the entire shut off valve assembly 10. This compact axial dimension minimizes the volume of fuel that can leak out from between the main and secondary poppets in the event of a shear fitting fracture, while also minimizing the overall axial length of the entire shut off valve assembly. This latter consideration is important, in that it allows the shut off valve 10 to be installed (in most cases) in the standard vertical clearance beneath the typical dispenser.

What is claimed is:

1. A shut off valve assembly, comprising:
   a first sub-housing having a flow passage extending between an upstream end and a downstream end;
   a normally-open main valve, contained in the first sub-housing, that closes in response to a shear force of greater than a predetermined magnitude;
   biasing means for biasing the main valve toward a closed position;
   a second sub-housing having a flow passage extending between an upstream end and a downstream end;
   a normally-closed secondary valve, contained in the second sub-housing, that opens in response to a predetermined fluid pressure, and that closes the flow passage through the second sub-housing in the absence of the predetermined fluid pressure;
   a hollow shear fitting having an upstream and removably coupled to the first sub-housing downstream end and a downstream end removably coupled to the second sub-housing upstream end, so as to define a continuous internal fluid flow passage that is substantially unobstructed and unrestricted from the first sub-housing upstream end to the second sub-housing downstream end, the shear fitting having a weakened wall area that fractures in response to a shear force of greater than a predetermined magnitude; and
   locking means on the shear fitting, and coupling the shear fitting and the main valve, for locking the main valve open against the force of the biasing means, and for releasing the main valve to close in response to a shear force of greater than a predetermined magnitude;
   whereby the first and second sub-housings remain intact upon the fracturing of the shear fitting at the weakened wall area, so that the flow passage through the second subhousing remains closed by the secondary valve upon the removal of the shear fitting.

2. The shut off valve assembly of claim 2, wherein the weakened wall area of the shear fitting includes an annular groove in the external wall surface of the shear fitting.

3. The shut off valve assembly of claim 1, wherein the locking means includes fusible linking means for releasing the main valve to close in response to a predetermined temperature.

4. The shut off valve assembly of claim 3, wherein the locking means comprises:
   a first locking arm member, having a first end operatively connected to the main valve, and a second end;
   a second locking arm member, having a first end rigidly joined to the second end of the first locking arm member by the fusible linking means, and a second end having an aperture; and
   a locking pin extending from the side of the shear fitting and receivable in the aperture in the second end of the second locking arm member;
   whereby the locking pin is received in the aperture to lock the main valve open, and is moved from the aperture to release the main valve in response to a shear force of greater than a predetermined magnitude.

5. The shut off valve assembly of claim 4, wherein the locking pin is located on the shear fitting downstream from the weakened wall area.

6. The shut off valve assembly of claim 1, wherein the first sub-housing includes a valve seat against which the main valve closes.

7. An improved shut off valve assembly, of the type including a normally open main valve that closes in response to a shear force of greater than a predetermined magnitude, and a normally closed secondary valve downstream from the main valve that opens in response to a predetermined fluid pressure, wherein the improvement comprises:
   a first sub-housing containing the main valve, and having a first flow passage between an upstream end and a downstream end;
   a second sub-housing containing the secondary valve, and having a second flow passage between an upstream end and a downstream end, the second flow passage being closed by the secondary valve in the absence of the predetermined fluid pressure;
   biasing means for biasing the main valve toward a closed position;
   a hollow, tubular shear fitting having a weakened wall area that fractures in response to a shear force of greater than a predetermined magnitude, the shear fitting having an upstream and removably coupled to the downstream end of the first sub-housing and a downstream end removably coupled to the upstream end of the second sub-housing, a third flow passage being defined between the upstream and downstream ends of the shear fitting, the third flow passage being substantially unobstructed and unrestricted; and locking means on the shear fitting, and coupling the shear fitting and the main valve, for locking the main valve open against the force of the biasing means, and for releasing the main valve to close in response to a shear force of greater than a predetermined magnitude;

whereby the first sub-housing, the shear fitting, and the second sub-housing are axially aligned also that the first, second, and third flow passages define a continuous internal flow passage from the upstream end of the first sub-housing to the downstream end of the second sub-housing; and whereby the first and second sub-housing remain intact upon the fracturing of the shear fitting at the weakened wall area, so that the second flow passage remains closed by the secondary valve upon removal of the shear fitting.

8. The improved shut off valve assembly of claim 7, wherein the locking means includes fusible linking means for releasing the main valve to close in response to a predetermined temperature.

9. The improved shut off valve assembly of claim 8, wherein the locking means comprises:

a first locking arm member, having a first end operatively connected to the main valve, and a second end;

a second locking arm member, having a first end rigidly joined to the second end of the first locking arm member by the fusible linking means, and a second end having an aperture; and a locking pin extending from the side of the shear fitting and receivable in the aperture in the second end of the second locking arm member;

whereby the locking pin is received in the aperture to lock the main valve open, and is removed from the aperture to release the main valve in response to a shear force of greater than a predetermined magnitude.

10. The improved shut off valve assembly of claim 9, wherein the looking pin is located on the shear fitting downstream from the weakened wall area.

11. The improved shut off valve assembly of claim 10, wherein the weakened wall area is an annular shear groove in the wall of the shear fitting.

12. The shut off valve assembly of claim 7, wherein the first sub-housing includes a valve seat against which the main valve closes.

13. A shut off valve assembly, comprising:

a first sub-housing having a flow passage extending between an upstream end and a downstream end;

a normally-open main valve, contained in the first sub-housing, that closes in response to a shear force of greater than a predetermined magnitude;

a second sub-housing having a flow passage extending between an upstream end and a downstream end;

a normally-closed secondary valve, contained in the second sub-housing, that opens in response to the pressure of fluid flowing into the inlet of the second sub-housing;

a hollow shear fitting having an upstream end removably coupled to the first sub-housing downstream end and a downstream end removably coupled to the second sub-housing upstream end, so as to define a continuous internal fluid flow passage that is substantially unobstructed and unrestricted from the first sub-housing upstream end to the seccnd sub-housing downstream end, the shear fitting having a weakened wall area that fractures in response to a shear force of greater than a predetermined magnitude;

biasing means for biasing the main valve toward a closed position; and locking means, coupling the shear fitting and the main valve, for locking the main valve open against the force of the biasing means, and for releasing the main valve to close in response to a shear force of greater than a predetermined magnitude, the locking means comprising:

locking arm means, having a first end operatively connected to the main valve, and a second end having an aperture; and a locking pin extending from the side of the shear fitting downstream from the weakened wall area and receivable in the aperture in the second end of the locking arm means;

whereby the locking pin is received in the aperture to lock the main valve open, and is removed from the aperture to release the main valve in response to a shear force of greater than a predetermined magnitude.

14. The shut off valve assembly of claim 13, wherein the locking arm means includes fusible linking means for releasing the main valve to close in response to a predetermined temperature.

15. The shut off valve assembly of claim 14, wherein the locking arm means comprises:

a first locking arm member, having a first end operatively connected to the main valve, and a second end; and a second locking arm member, having a first end rigidly joined to the second end of the first locking arm member by the fusible linking means, and a second end having the aperture.

16. The shut off valve assembly of claim 13, wherein the weakened wall area is an annular shear groove.

17. A shut off valve assembly of claim 13, wherein the first sub-housing includes a valve seat against which the main valve closes.

* * * * *